United States Patent
Farrar et al.

(10) Patent No.: US 8,332,664 B2
(45) Date of Patent: Dec. 11, 2012

(54) SYSTEMS AND METHODS FOR PROVIDING DEVICE-TO-DEVICE HANDSHAKING THROUGH A POWER SUPPLY SIGNAL

(75) Inventors: Doug Farrar, Los Altos, CA (US); Lawrence Heyl, Colchester, VT (US); Brian Sander, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1050 days.

(21) Appl. No.: 12/157,912

(22) Filed: Jun. 13, 2008

(65) Prior Publication Data
US 2008/0309313 A1 Dec. 18, 2008

Related U.S. Application Data

(60) Provisional application No. 60/934,733, filed on Jun. 15, 2007.

(51) Int. Cl.
*G06F 1/00* (2006.01)
(52) U.S. Cl. .......... 713/300; 713/330; 713/340; 710/14; 710/105
(58) Field of Classification Search .................. 713/300, 713/330, 340; 710/14, 105, 303, 305, 6, 710/306, 316
See application file for complete search history.

(56) References Cited

U.S. PATENT DOCUMENTS

| | | | |
|---|---|---|---|
| 4,477,896 A | 10/1984 | Aker | |
| 5,557,579 A * | 9/1996 | Raad et al. | 365/226 |
| 5,994,998 A * | 11/1999 | Fisher et al. | 375/258 |
| 6,252,375 B1 * | 6/2001 | Richter et al. | 320/127 |
| 6,281,784 B1 * | 8/2001 | Redgate et al. | 340/12.33 |
| 6,473,608 B1 * | 10/2002 | Lehr et al. | 455/402 |
| 6,535,983 B1 * | 3/2003 | McCormack et al. | 713/310 |
| 6,541,879 B1 | 4/2003 | Wright | |
| 6,571,181 B1 * | 5/2003 | Rakshani et al. | 702/60 |
| 6,643,566 B1 * | 11/2003 | Lehr et al. | 700/286 |
| 6,762,675 B1 * | 7/2004 | Cafiero et al. | 340/10.42 |

(Continued)

FOREIGN PATENT DOCUMENTS

CN 1444150 9/2003

(Continued)

OTHER PUBLICATIONS

USB Implementers Forum, Inc. On-The-Go Supplement to the USB 2.0 Specification. Revision 1.0a. Jun. 24, 2003.*

(Continued)

*Primary Examiner* — Matthew D Spittle
(74) *Attorney, Agent, or Firm* — Womble Carlyle Sandridge & Rice LLP (57) ABSTRACT

Handshaking circuits are provided in a communications cable and in a device operable to be mated with the communications cable. Before a device can utilize the power supply signal of such a communications channel, the two handshaking circuits must sufficiently identify one another over a power supply signal with a decreased voltage. The decreased voltage allows for a cable plug to be provided with a safe, protected power that cannot cause harm to a human. The decreased voltage also reduces the chance that a device can receive a primary power supply signal from the cable before the device sufficiently identifies itself. Accordingly, a laptop may be connected to a portable music player, but the voltage of the power supply signal provided by the laptop to the cable may be decreased on-cable until the handshaking circuit of the portable music player sufficiently performs a handshaking operation with a on-cable handshaking circuit.

20 Claims, 6 Drawing Sheets

U.S. PATENT DOCUMENTS

| | | | |
|---|---|---|---|
| 6,963,933 B2 * | 11/2005 | Saito et al. .................... 710/1 |
| 6,978,319 B1 * | 12/2005 | Rostoker et al. ............. 709/250 |
| 6,985,713 B2 * | 1/2006 | Lehr et al. .................. 455/343.5 |
| 6,986,071 B2 * | 1/2006 | Darshan et al. ............. 713/330 |
| 7,024,567 B2 * | 4/2006 | Kim et al. .................... 713/300 |
| 7,054,779 B2 * | 5/2006 | Rakshani et al. ............ 702/117 |
| 7,058,484 B1 | 6/2006 | Potega |
| 7,114,030 B2 * | 9/2006 | Teicher et al. ............... 711/115 |
| 7,132,927 B2 * | 11/2006 | Rapaich ........................ 713/300 |
| 7,174,408 B2 * | 2/2007 | Ede ............................... 710/306 |
| 7,193,442 B2 * | 3/2007 | Zhu ................................ 326/82 |
| 7,230,412 B2 * | 6/2007 | Stineman et al. .......... 324/76.11 |
| 7,248,097 B2 * | 7/2007 | Montgomery ............... 327/538 |
| 7,293,122 B1 | 11/2007 | Schubert et al. |
| 7,299,368 B2 * | 11/2007 | Peker et al. .................. 713/300 |
| 7,359,959 B2 * | 4/2008 | Lizzi et al. ................... 709/221 |
| 7,421,594 B2 * | 9/2008 | Nakajima et al. ........... 713/300 |
| 7,424,569 B2 * | 9/2008 | Matsuda ....................... 710/316 |
| 7,436,687 B2 * | 10/2008 | Patel ............................. 363/142 |
| 7,447,922 B1 * | 11/2008 | Asbury et al. ................ 713/300 |
| 7,564,678 B2 * | 7/2009 | Langberg et al. ........ 361/679.01 |
| 7,593,756 B2 * | 9/2009 | Ferentz et al. ................ 455/572 |
| 7,613,939 B2 * | 11/2009 | Karam et al. ................. 713/300 |
| 7,680,973 B2 * | 3/2010 | Goldstein et al. ............ 710/260 |
| 7,750,939 B2 * | 7/2010 | Kobayashi et al. ......... 348/207.1 |
| 7,752,467 B2 * | 7/2010 | Tokue ........................... 713/300 |
| 7,793,137 B2 * | 9/2010 | Karam et al. ................. 714/4.12 |
| 7,804,025 B2 * | 9/2010 | Terlizzi .......................... 174/36 |
| 7,814,342 B2 * | 10/2010 | Hussain et al. ............... 713/300 |
| 7,823,026 B2 * | 10/2010 | Karam et al. .................. 714/43 |
| 7,849,351 B2 * | 12/2010 | Karam et al. .................. 714/4.1 |
| 7,882,288 B2 * | 2/2011 | Moosavi ....................... 710/106 |
| 7,903,809 B2 * | 3/2011 | Karam ........................... 379/413 |
| 7,915,755 B2 * | 3/2011 | Diab et al. ..................... 307/17 |
| 8,060,070 B2 * | 11/2011 | Lazaridis ...................... 455/417 |
| 2002/0136243 A1 | 9/2002 | Dietrich et al. |
| 2003/0060243 A1 | 3/2003 | Burrus, IV |
| 2004/0224638 A1 | 11/2004 | Fadell et al. |
| 2004/0254663 A1 * | 12/2004 | Dame ............................ 700/94 |
| 2005/0070153 A1 * | 3/2005 | Tang ............................. 439/502 |
| 2005/0240705 A1 * | 10/2005 | Novotney et al. ............ 710/303 |
| 2006/0059289 A1 * | 3/2006 | Ng et al. ....................... 710/305 |
| 2006/0082220 A1 * | 4/2006 | Karam et al. ................. 307/4 |
| 2006/0125445 A1 * | 6/2006 | Cao et al. ..................... 320/112 |
| 2006/0168459 A1 * | 7/2006 | Dwelley et al. .............. 713/300 |
| 2007/0022311 A1 * | 1/2007 | Park ............................. 713/310 |
| 2007/0230910 A1 * | 10/2007 | Welch et al. .................. 386/96 |
| 2008/0178011 A1 * | 7/2008 | Hubo et al. ................... 713/300 |
| 2009/0140772 A1 * | 6/2009 | Seth et al. ..................... 326/86 |
| 2011/0087805 A1 * | 4/2011 | Liu et al. ....................... 710/14 |

FOREIGN PATENT DOCUMENTS

| | | |
|---|---|---|
| CN | 1574541 | 2/2005 |
| CN | 2842838 | 11/2006 |
| CN | 1972053 | 5/2007 |
| EP | 1158593 | 11/2001 |
| EP | 1 816 571 A1 | 8/2007 |
| JP | 2006148593 | 6/2006 |
| WO | WO 2007/044540 | 4/2007 |
| WO | WO 2007/103358 | 9/2007 |

OTHER PUBLICATIONS

Eisen, Morty. Introduction to PoE and the IEEE802.3af and 802.3at Standards. Oct. 29, 2009.*

Maxim Integrated Products. Power-Line Communications (PLC) Integrated Analog Front-End Transceiver. Revision 0. Jan. 2010.*

Yin et al. Dual Low-Voltage IC Design for High-Voltage Floating Gate Drives. IEEE Transactions on Circuits and Systems. vol. 55. No. 6. Jul. 2008.*

* cited by examiner

SYSTEMS AND METHODS FOR PROVIDING DEVICE-TO-DEVICE HANDSHAKING THROUGH A POWER SUPPLY SIGNAL

CROSS-REFERENCE TO RELATED APPLICATION

This application claims the benefit of U.S. Provisional Application No. 60/934,733, filed Jun. 15, 2007, the disclosure of which is incorporated by reference herein in its entirety.

BACKGROUND OF THE INVENTION

This invention relates to power regulation. More particularly, this invention relates to safe power delivery.

A traditional Universal Serial Bus (USB) jack continually provides a power supply signal at a specific voltage to any cable connected to that USB jack via a USB plug. The electrical contacts of a traditional USB plug, however, are protected by a protective housing so that a user cannot accidentally touch the contacts of the USB plug.

Not all cables operable to mate with a USB jack, however, utilize USB plugs at each end. In fact, some cables include a protected USB plug at one end and an unprotected plug at the other end. Such cables are able to connect a USB device with a device that does not have a USB jack. Such cables are deficient, however, as a power supply signal may be provided to the unprotected plug when the unprotected plug is not mated to a device. A person touching an unprotected plug may be harmed as an undesirable power supply signal may flow directly into that person's body. Such cables are also deficient as an undesirable power supply signal may be provided to a device even if the unprotected plug is not properly mated with the device. A device may be severely damaged if a power signal is provided to the wrong contacts of a device or an undesirable power signal is provided to the correct contacts of a device. Accordingly, it is therefore desirable to provide a cable with improved safety measures for both human and device interaction.

Additionally, companies occasionally try to create accessories for devices without the permission of the manufacturers of such devices. Such accessories are deficient, however, and may harm the devices by providing data and power signals that can damage the devices. It is therefore desirable to eliminate the ability of third-party accessories to access a device in order to protect such a device from receiving data and power signals that may damage the device.

Traditional USB protocols include ACK (receipt of error-free data packet), NAK (receiving device cannot accept data), STALL (end is postponed), and NYET (no response yet). Such protocols are deficient, however, as such protocols do not provide enhanced functionality. It is therefore desirable to provide circuitry with an enhanced range of communication capabilities and device functionality.

SUMMARY OF THE INVENTION

Handshaking circuits are provided that can identify one another using a power supply signal. Such handshaking circuits can also control the characteristics of the power supply signal so that a desirable power supply signal is delivered at a desirable time. Such handshaking circuits may, for example, regulate the voltage or current of a power supply signal as well as embed information into a power supply signal by manipulating the voltage or current of a power supply signal. Accordingly, handshaking circuitry is provided that allows devices to identify one another through a signal (e.g., a power supply signal) as well as communicate additional (e.g., power supply control information).

Handshaking circuits may receive information embedded in the power supply signal from each other and may, in turn, utilize the received information to perform different types of operations. For example, a handshaking circuit may change the voltage of a power supply signal being supplied to a different handshaking circuit based on information received from this different handshaking circuit. For example, a handshaking circuit may introduce pulses of current into a power supply signal that the handshaking circuit receives. Such current pulses may be detectable and identifiable by the circuitry providing the power supply signal. Information sent to a circuit providing a power supply signal may instruct the circuit to, for example, increase or decrease the voltage of the power supply signal to a particular amount. Such information may alternatively, for example, instruct the circuit providing the power supply signal at a particular voltage to continue providing the power signal at that particular voltage.

A handshaking circuit may be provided in a cable having a power supply line. In doing so, the cable can modify the characteristics of any power supply signal provided through the cable independent of any device connected to the cable. A handshaking circuit may be provided on any portion of a cable. For example, a handshaking circuit may be provided as a flexible integrated circuit located in a part of the body or plugs of the cable. Accordingly, an on-cable handshaking circuit is provided.

A handshaking circuit may be provided in a device such as a portable device. The on-device handshaking circuit may interact with an on-cable handshaking circuit to make sure that the device is provided with a desired power supply signal at a desired time. In addition to power, data may also be provided through the cable and the handshaking circuit may, or may not, control or manipulate the flow of data through the cable's data channels. For example, one device that includes a handshaking circuit may take the form of a portable music player. The on-cable and on-device handshaking circuits may be utilized to make sure a power supply signal is being properly supplied to the device before the primary circuitry of the device is allowed to connect to the cable and receive the data portion (e.g., music data) of the communication.

A cable is provided that includes a USB plug at one end and an unprotected, multiple-region plug at the other end. A handshaking circuit is provided in the cable. Another handshaking circuit is provided in a portable device. The on-cable handshaking circuit may receive a relatively HIGH power signal (e.g., 5 volts @500 mA) and may step the voltage of this relatively HIGH power signal down to a particular, relatively LOW power signal (e.g., a current-limited 2.9 volts). The on-device handshaking circuit may be configured to look for a characteristic of this particular, relatively LOW power signal such as, for example, the voltage of this power supply signal. Once this particular, relatively LOW power signal is recognized for a particular period of time (e.g., 0.5 seconds), the on-device handshaking circuit may introduce current pulses into the power supply signal that the on-device handshaking circuit is receiving from the on-cable handshaking circuit. These current pulses may then, in turn, be recognized by the on-cable handshaking circuit providing the power supply signal. The current pulses provided by the on-device handshaking circuit may, for example, communicate control information to the on-cable handshaking circuit. For example, the current pulses may instruct the on-cable handshaking circuit that the on-device handshaking circuit desires to receive a HIGH power signal instead of a LOW power signal. Thus, for example, once the on-cable handshaking circuit recognizes the current pulses, the on-cable handshaking circuit may step the particular, relatively LOW power signal (e.g., a current-limited 2.9 volts) up to a relatively HIGH power signal (e.g., 5 volts @500 mA).

Handshaking circuits may provide, for example, two handshaking steps. In the first handshaking step, for example, the on-cable handshaking circuit may identify itself by sending a particular voltage, continuously, for at least a particular amount of time. The first handshaking step may complete when the on-device handshaking circuit recognizes that the particular voltage was sent for at least the particular amount of time. In the second handshaking step, the on-device handshaking circuit may identify itself by introducing current spikes into the power supply signal. The second handshaking step may complete when the on-cable handshaking circuit recognizes the current spikes from the on-device handshaking circuit. Different types of current spikes can be sent from the on-device handshaking circuit to instruct the on-cable handshaking circuit to perform different types of operations. Similarly, for example, different (e.g., pre-determined) voltages may be sent from the on-cable handshaking circuit to instruct the on-device handshaking circuit to perform different types of information. Additional handshaking steps may be included as part of an overall handshaking routine.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
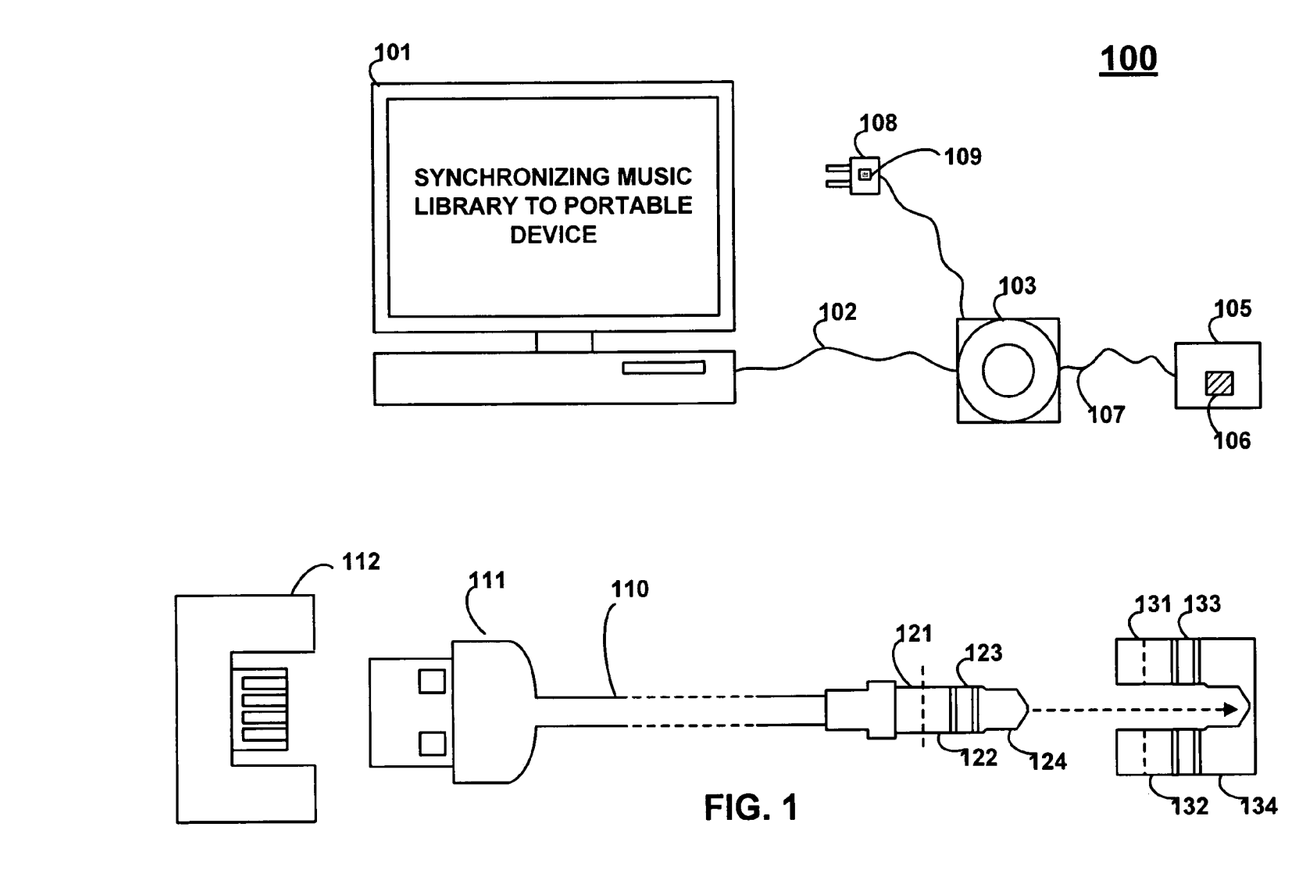
FIG. 1 is an illustration of a data and power delivery topology constructed in accordance with an embodiment of the present invention.

FIG. 1 shows topology 100 that may include device 101 and device 103 that are electrically coupled together via cable 102.

Device 101 and device 103 may be coupled together so that, for example, data and/or power may be transferred between devices 101 and 103. Devices 101 and 103 may be any type of devices such as, for example, portable laptops, stationary personal computers, telephonic devices, audio/video playback devices, accessories, or any other type of device. For example, device 101 may be a computer while device 103 may be an audio playback device such as, for example an iPod™ (available from Apple Inc. of Cupertino, Calif.). As such, device 101 may utilize cable 102 to power and recharge device 103 while transferring audio data to device 103.

Cable 102 may be, for example, a USB cable. Such a USB cable may be utilized to provide a power signal from one device (e.g., a laptop) to another device (e.g., an accessory or portable electronic device). Accordingly, an on-cable handshaking circuit may step-down the power signal supplied by the device (e.g., a laptop) to a portable electronic device, wait to recognize the appropriate current spikes provided by an accessory, and step-up the voltage to an appropriate level in response to the appropriate current spikes. In doing so, for example, only authorized devices may be able to utilize a USB cable having an on-cable handshaking circuit. Unrecognized devices may not have the capability, for example, of sending the appropriate current spikes that are identifiable by the on-cable handshaking circuit. Accordingly, on-cable (e.g., on-USB cable) and on-device (e.g., on-portable electronic device) handshaking circuitry may be provided to ensure that only authorized devices have the capability of properly mating and operating with each other.

Persons skilled in the art will appreciate that a device may receive too much power through a cable (e.g., a USB cable), receive an improperly regulated power supply signal through a cable, or otherwise be exposed to a potentially harmful power supply signal. Accordingly, handshaking circuits may be included in cables and devices so that a device may identify and authenticate a cable through the handshaking circuitry prior to utilizing a power supply signal. Similarly, a device can be protected from an accessory that could damage a device's power regulation and transmission circuitry.

Alternatively, the handshaking circuitry in a cable may lower the power supply signal for a particular device based on identification current pulses provided by that device. In doing so, for example, the cable may step a voltage down to an appropriate level in response to proper identification current spikes that are associated with such a regulation scheme. In this manner, a power supply signal may be changed to a predetermined value based on the handshake received.

An on-cable handshaking circuitry may include, for example, on-cable memory that includes a table that associates particular types of current spikes to particular actions. Such a table, for example, may include data associated with how an on-cable handshaking circuit should operate when connected to different accessories or portable electronic devices.

Figure 1A:
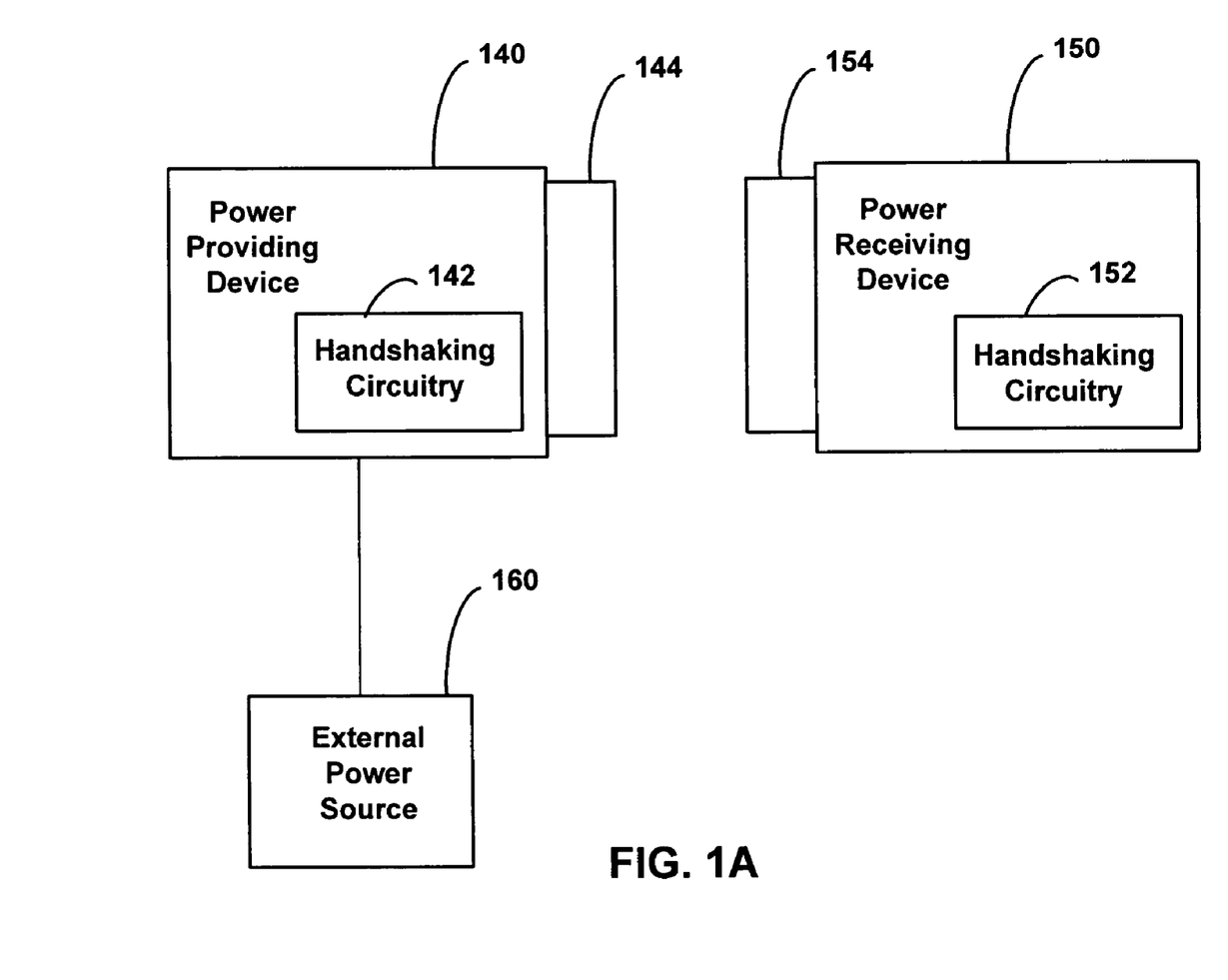
FIG. 1A is an illustration of a power delivery topology constructed in accordance with an embodiment of the present invention.

FIG. 1A illustrates an example of two devices each having handshaking circuits in accordance with an embodiment of the invention. As shown, power providing device 140 includes a handshaking circuitry 142 (e.g., circuitry 500 of FIG. 5) may be provided in a device providing a power signal. Power providing device 140 may receive power from external power source 160 (e.g., wall outlet, battery, etc.) and regulate how power is provided to power receiving device 150, which includes handshaking circuitry 152 (e.g., circuitry 400 of FIG. 4). Device 140 and device 150 may be directly coupled together via interfaces 144 and 154, or devices 140 and 150 may be connected with a cable having the appropriate connectors to mate with interfaces 144 and 154, though the cable, including its connectors, may not have any handshaking circuitry. For example, device 140 may be any suitable device such as an accessory (e.g., wall mounted charger, a car charger, docking station, speaker docking system) or a computer, and device 150 may be a portable electronic device such as an iPod or iPhone. Interfaces 144 and 154 may be proprietary multi-contact connectors (e.g., a 30-pin connector) a USB connectors, Firewire connectors, 3.5 or 2.5 mm jack connectors, a combination thereof, or any other suitable connector.

In order to protect device 103 from, for example, receiving an undesirable power supply signal, handshaking circuitry may be provided to make sure the appropriate power supply signal is supplied to device 103 at the appropriate time. Handshaking circuitry may also, for example, allow devices to identify each other such that devices without a handshaking circuit cannot be utilized.

A handshaking protocol may include any number of stages. For example, a handshaking protocol may be initiated by an initiating handshaking circuit providing a power supply signal. This initiating handshaking circuit may, for example, change a characteristic of the power supply signal in a particular manner. For example, the initiating handshaking circuit may decrease the voltage of the power supply signal to a particular amount that a responding handshaking circuit may expect to see in place of the increased, primary power supply signal.

A responding handshaking circuit may receive a power supply signal and may determine whether a characteristic of the power supply signal is within a particular range. For example, the responding handshaking circuit may determine whether the voltage of the power supply signal is within a particular range. Such a voltage range may be, for example, based off the voltage that an initiating handshaking circuit would provide during a handshaking routine (e.g., 2.9 volts) and a margin of error (e.g., +0.2 volts and −0.2 volts). If, for example, the responding handshaking circuitry receives a power supply signal with a voltage in this voltage range, the responding handshaking circuitry may wait a particular amount of time (e.g., 0.5 seconds) in order to confirm that the voltage of power supply signal is steady. Once the time requirement of the handshaking routine has been met, the responding handshaking circuitry may manipulate the power supply signal in a manner that is detectable by the initiating handshaking circuitry. For example, current pulses may be introduced into the power supply signal that may be detected by the initiating handshaking circuitry. Once the initiating handshaking circuitry detects such current pulses, the initiating handshaking circuitry may, for example, change a characteristic of the power supply signal. Particularly, for example, the initiating handshaking circuitry may increase the voltage of the power supply signal to a power supply signal for powering and recharging a particular device.

Persons skilled in the art will appreciate that if, for example, the responding handshaking circuit does not receive a voltage within the expected range, the handshaking circuit may not forward the power supply signal to other circuitry such as the primary circuitry of a device. Alternatively, for example, the primary circuitry of a device may not allow a power supply signal to power the primary circuitry if a characteristic of the power supply signal does not meet a threshold. For example the primary circuitry of a device may not utilize a power supply signal received from a handshaking circuit if the voltage of the power supply signal does not exceed a pre-determined voltage (e.g., 4.5 volts).

A handshaking circuit may be dedicated to an initiating or responding functionality. Alternatively, a handshaking circuit can include both an initiating and responding functionality. Alternatively still, a handshaking circuit may be fabricated with both an initiating and responding functionality, but only one of these functionalities may be enabled during manufacturing or distribution. Additionally, any portion of a handshaking device may be embodied in hardware (e.g., analog and/or digital circuitry) and/or software. For example, a handshaking device may be fabricated as a flexible integrated circuit.

Persons skilled in the art will appreciate that a handshaking protocol may be performed over a data line instead of a power supply line. Similarly, a data line may not be affected by a handshaking protocol over a power line or transmission through a data line may be controlled/stopped by a handshaking protocol.

Cable 102 may be any type of cable such as, for example, a wire-based cable or an optical cable. Similarly, cable 102 may include a plug at each end. Such plugs may be of the same type or different types of plugs. For example, the plugs of cable 102 may be USB plugs. As per another example, one plug of cable 102 may be a USB plug while another plug of cable 102 may be a multiple region vertical plug (e.g., a four region vertical plug). Persons skilled in the art will appreciate that a cable may have more than two plugs. For example, a cable may have one primary USB plug and the cable from this plug may split off into multiple plugs (e.g., a microphone plug, a FireWire plug, a USB 2.0 plug, an A/V plug, a component plug, an HDMI plug). As per another example, an end of a cable may be open in such a manner that this end does not contain a plug, but allows direct access to the internal channels of the cable. Cable 102 may include any number of power and/or data channels.

Cable 102 may be, for example, cable 110 that includes a protected, USB plug 111 that can couple to USB jack 112. Cable 110 may also include a multiple-region vertical male plug that can couple to a multiple-region vertical female jack. The multiple-region plug may include multiple contacts for the delivery of power and data signals. For example, the multiple-region plug may be a four-region plug. Contact 121 may be a power supply contact. Contact 122 may be a ground contact. Channel 123 may be a data contact. Contact 124 may be another data contact. The four-region plug may be operable to couple to an associated four-region jack. The four-region plug may be considered a vertical plug in that at least one contact on the plug has to pass by an unrelated contact on a jack in order for that contact to electrically couple to the correct contact on the jack. For example, contact 124 has to pass contacts 131, 132, and 133 in order to electrically contact with channel 134. As such, contacts on a vertical plug may regularly couple with unwanted contacts on an associated jack while the plug is mechanically mating with the jack.

Figure 2:
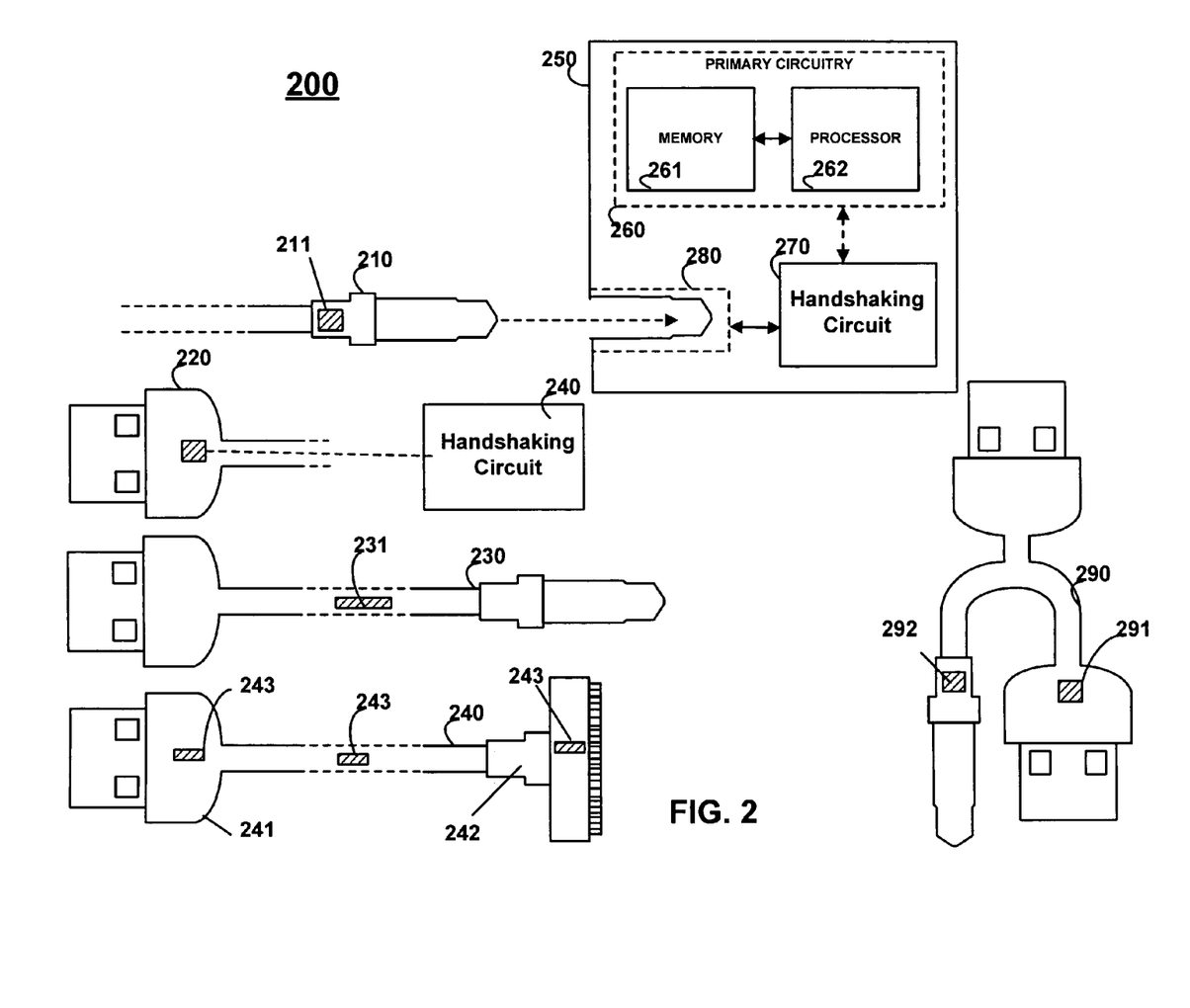
FIG. 2 is an illustration of a data and power delivery topology including on-cable and on-device handshaking circuits constructed in accordance with an embodiment of the present invention.

FIG. 2 shows various handshaking circuit topologies 200. For example, plug 210 may include handshaking circuit 211 that can communicate with handshaking circuit 270 of device 250. In this manner, plug 210 may include an on-plug handshaking circuit while device 250 includes an on-device handshaking circuit. Handshaking circuit 270 may communicate with, for example, circuitry 260. Memory 261 and/or processor 262 may be included in circuitry 260.

An on-cable handshaking circuit may be provided on any portion of a cable. For example, cable 220 provides handshaking circuit 240 on a plug other than a plug operable to couple to jack 280 of device 250 so that cable 220 may also include a plug without handshaking circuit 240 that is operable to couple to jack 280 of device 250. In doing so, for example, cable 220 may couple to jack 280 of device 250 with a plug that does not include a handshaking circuit, while having a plug that does include a handshaking circuit so that a handshaking process may still be performed. As another example, handshaking circuit 240 may be provided on the body of a cable instead of the plug of a cable (e.g., as in handshaking circuit 231 of cable 230). In yet another example, cable 290 may be provided that includes a plug without handshaking circuit 240 that splits into two different plugs that each include a handshaking circuit (e.g., handshaking circuits 291 and 292). In providing multiple plugs with different handshaking circuits, a device may be able to identify each plug separately as the handshaking circuits may operate differently (e.g., provide a different initial handshake voltage).

Persons skilled in the art will appreciate that a cable may include any number of plugs and that such plugs may be of varying types. In this manner, for example, one end of a plug may be a wireless receiver/transmitter for wirelessly receiving/transmitting communications signals such as handshaking signals.

A plug may be, for example, a multiple-pin connection plug such as 30-pin connection plug 242. One example of a 30-pin connection plug is described in U.S. Pat. No. 7,627,343, issued Dec. 1, 2009, which is hereby incorporated by reference herein in its entirety. Further discussion of a 30-pin connection plug can be found in U.S. Pat. No. 7,293,122, which is hereby incorporated by reference in its entirety. The 30-pin connecter may exist in male and female form. The female form of the 30-pin connector typically resides inside a portable electronic device. In some embodiments, the female 30-pin connector can have a keying structure to guide a counterpart male connector therein, first mate, last break ground contact pins, and several pins arranged in a row, in sequential order.

The male form of the 30-pin connector is typically included with accessories such as docking stations, speaker systems, cables, car chargers, or any other suitable device, some of which may be capable of receiving power from an external power source. The accessories typically include a circuit board to which the 30-pin connector is mounted. The 30-pin connector may include a housing designed to accommodate at least 30 contacts spaced apart in a single row of sequentially numbered contact locations, the sequentially numbered contact locations including digital contact locations, analog contact locations and ground contact locations. The contact locations may be selectively populated with one or more electrical contacts. The male 30-pin may also include a keying structure. In some embodiments, handshaking circuitry (e.g., on-cable handshaking circuitry) may be included in the accessory and is electrically coupled to at least one of the electrical contacts.

As mentioned above, persons skilled in the art will appreciate that a cable may include any number of plugs and that such plugs may be of varying types. For example, one end of cable 240 can be 30-pin connection plug 242 and another end can be USB plug 241. In this manner, handshaking circuitry 243 can be located in one or more of cable 240, 30-pin connection plug 242, and USB plug 241.

Persons skilled in the art will also appreciate that a device that is providing power to a second device may be coupled via a cable that includes two handshaking circuits. Handshaking circuits may, for example, be included in both the device that is providing a power signal and the device that is receiving a power signal. Accordingly, the cable may be able to identify the devices that are coupled to the cable via the varying handshaking circuits. In this manner, the cable may become aware of its operational environment and may change its own operation autonomously. For example, the cable may include a microprocessor, memory, and source of power such as a battery. The cable may be programmed to provide different functionalities depending on the operating environment. For example, suppose a user has a secure laptop that includes a handshaking circuit operable to provide a specific identification for that laptop. Accordingly, suppose a user requires the use of a secure accessory such as a secure backup memory device. This secure backup memory device may include a handshaking circuit that may be able to provide a specific identification for that memory device. Thus, a cable may be issued to a user that allows, for example, one or more signals to be transferred through the cable so long as the specific laptop and specific storage device are used. Accordingly, an administrator may program a cable with information indicative of different device identities and how the cable should operate once an operational environment is recognized. Utilizing the above example, suppose the secure storage device is connected, via the programmed cable, to a laptop other than the secure laptop. Accordingly, the cable may not allow signals, such as a power supply signal) to be provided to the secure storage device as the cable may recognize that the laptop as not being the secure laptop. Such a scheme provides, for example, increased security.

Persons skilled in the art will appreciate that if a cable includes, for example, a rechargeable source of power that such a rechargeable source of power may be recharged while the cable is provided with a power signal. Cables with handshaking circuits may be utilized to subvert unlicensed third-party accessories from damaging devices. Handshaking circuits may be used to identify, or may be provided in, any type of accessory and may be utilized to identify any specific accessory for any type of accessory. Such accessories may include, for example, headphones, portable media devices, speaker systems, microphones, storage devices, projectors, docking stations, display systems, radio systems, wireless communications systems, or any other device. Such accessories may be, for example, powered eternally or may receive power to operate from a parent device.

Persons skilled in the art will appreciate that a device that receives power from a device in one mode may provide power to a different device in another mode. For example, a portable media player may receive power from a personal computer (e.g., a laptop) through a cable. But, for example, that portable media player may then provide power to a device via the same, or different, cable. Accordingly, the handshaking circuits of the cable and/or the handshaking circuits of the associated devices may be made aware of the operational environment the cable and devices are operating in. Additionally, a portable media device may be subordinate to, and an accessory of, a laptop, but that portable media device may be a mated to a microphone and speaker headset. A portable media player may, for example, utilize an accessory device, such as a docking station, and handshaking circuits may be provided in the docking station, portable media device, and/or the associated cable. A 30-pin connector may be used to couple the two devices together via a plug. Accordingly, for example, the portable media device may be required to send a handshaking signal to the docking station before the docking station may receive signals from the portable music device (or vise versa). Such signals may include, for example, media information signals, control signals for either device, appropriate ground signals, power signals, or any other type of signal. For example, before transmitting power to a portable electronic device, the portable electronic device may require a suitable handshake from the accessory. As per another example, a device may require a suitable handshake from an accessory before transferring data (e.g., accepting a transfer of data). Accordingly, an authentication method is provided that may assist to ensure the safe transfer of power and/or data between a main device (e.g., via a handshaking circuit on device 103 of FIG. 1) and an accessory (e.g., handshaking circuit 106 of device 105 of FIG. 1 that, for example, can be coupled to device 103 through cable 107) and helps prevent unsuitable accessory devices from accidentally or intentionally harming the main device or associated user.

Handshaking circuitry may be included in a power supply or power adapter for a device. For example, handshaking circuitry 109 of FIG. 1 may be provided in wall power plug 108 of FIG. 1 and the handshaking circuitry 109 of plug 108 of FIG. 1 may perform a suitable handshake to a wall socket having a handshaking device.

A power adapter may be coupled between a device and an external or portable power supply. Such power adapters and power supplies may include handshaking circuitry. Such a power supply may include, for example, a battery, wall-socket, or cigarette lighter. A power adapter may be located on a power cord that is connecting a device to an external power supply. Accordingly, for example, when handshaking circuitry is located in a power supply or power adapter, the device may require that the power supply (or power adapter) send a handshaking signal prior to the device accepting power from the power supply.

Figure 3:
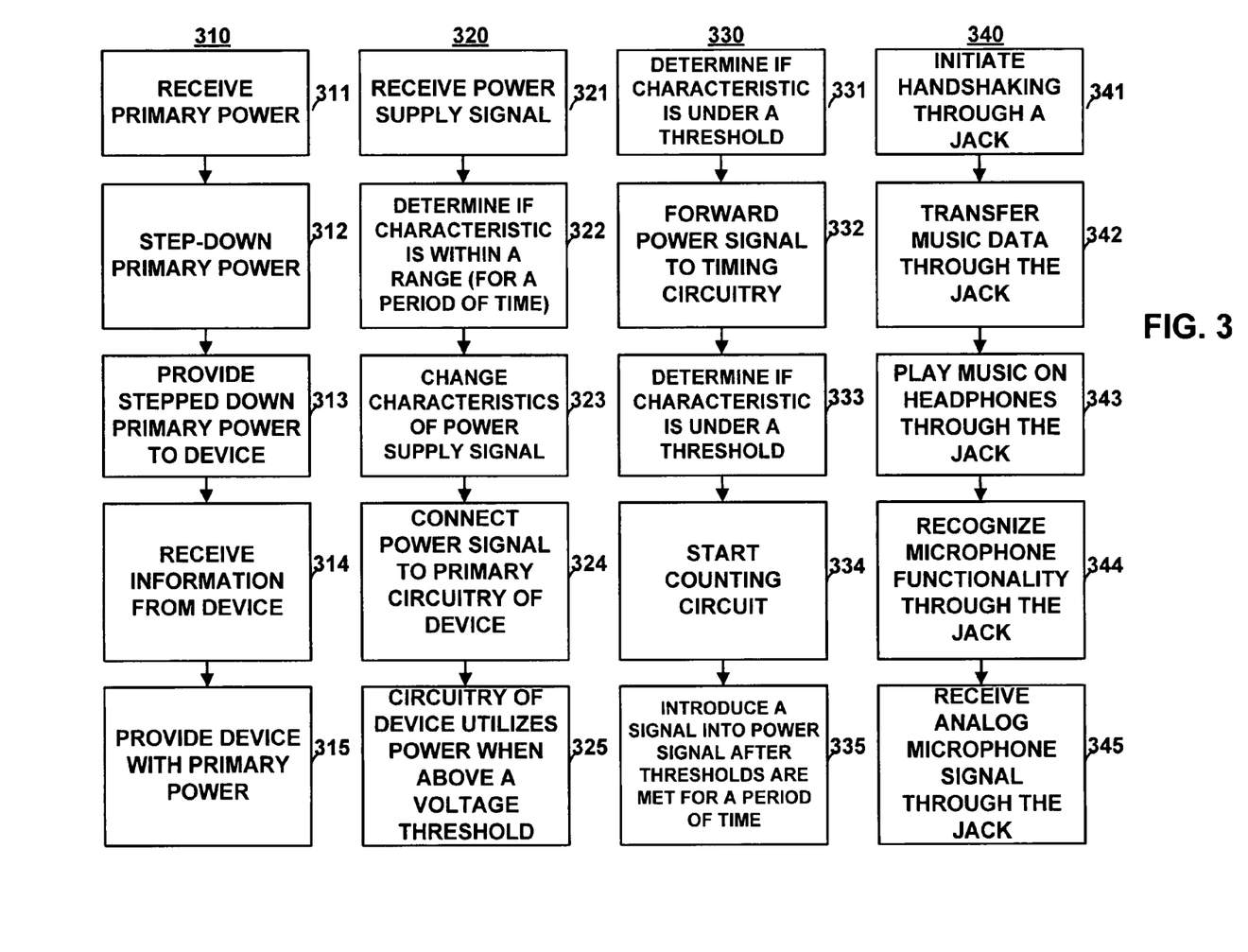
FIG. 3 is an illustration of process flow charts constructed in accordance with an embodiment of the present invention.

FIG. 3 shows flow charts 310, 320, 330, and 340, each of which includes a number of steps. Persons skilled in the art will appreciate that a flow chart may include additional steps, fewer steps, modified steps, and/or the order of the steps may be re-arranged. Flow chart 310 may initiate at step 311 when a handshaking circuit receives primary power in the form of a power supply signal. Such a handshaking circuit may step down the voltage of the power supply signal in step 312 to provide protected power to a device in step 313. The handshaking circuit may then wait until information is received back from the device in step 314. Such information may take the form of current pulses in the protected power provided to the device. In response to receiving the appropriate information, the handshaking circuit may step-up the protected power to a primary power voltage. The handshaking circuit may step-up the protected power by providing the primary power that the handshaking circuit receives to the device in step 315. Persons skilled in the art will appreciate that the source of primary power may be a DC signal from a battery, such as a battery concurrently powering a laptop, or an AC power signal from a wall outlet.

Flow chart 320 may initiate when, for example, a handshaking circuit receives a power supply signal in step 321. The handshaking circuit determines whether or not the received power supply signal is within a particular range in step 322. A power signal may be within a particular range, for example, if a characteristic of the power signal is within a particular range. For example, step 322 may determine whether the voltage of the power supply signal received by the handshaking circuit is within a particular range of voltages. Alternatively, for example, step 322 may determine whether a characteristic, such as voltage, is above or below a particular threshold. Step 322 may also determine whether the detected condition persists for a period of time. Once the conditions of step 322 are met, step 323 may initiate, in which characteristics of the power supply signal are changed in such a manner that the device providing the power supply signal can detect the changed characteristics. Thus, for example, step 323 may change the current of the power supply signal by introducing current pulses in the signal that are detectable at the device supplying power to the handshaking circuit. Once the pulses are generated and detected by the device, the device may couple the power supply signal to primary circuitry of the device in step 324. A determination as to whether the power supply signal exceeds a particular voltage or is within a particular range may be included in step 324 to ensure that a handshaking circuit at the device supplying the power supply signal has recognized the reception of the current pulses. Primary circuitry of a device may include circuitry to only allow a supply voltage signal having particular characteristics (e.g., an appropriate voltage) to connect to the primary circuitry (e.g., step 325).

Persons skilled in the art will appreciate that once a handshaking circuit in a device finishes the handshaking process and begins to receive a power supply signal appropriate to power the device, the handshaking circuit may continue to manipulate the protected power supply signal in the same manner the handshaking circuit did to receive the appropriate power supply signal. In other words, the handshaking circuit may continue to introduce current pulses into the power supply signal the entire time the device is receiving the power supply signal. In doing so, the initiating handshaking circuit that provides the power supply signal may be able to continually recognize that the responding handshaking circuit is electrically coupled to the initiating handshaking circuit. In the event that the two handshaking circuits are disconnected, the initiating handshaking circuit may realize the disconnection by recognizing the absence of the current pulses (or any information provided by a device connected to the initiating handshaking circuit). In doing so, the initiating handshaking circuit may realize that the initiating handshaking circuit should step the voltage of the supplied power signal down to an appropriate, protected power supply signal.

A responding handshaking circuit may continue sending current pulses across a power supply signal even after the voltage of the power supply signal is stepped-up to a level outside of the voltage range required to initiate the introduction of the current pulses to the power supply signal. In this manner, the responding handshaking circuit may continue to provide information to an initiating handshaking circuit such that the initiating handshaking circuit knows that the device is still connected. Persons skilled in the art will appreciate that disconnection may be determined in a variety of ways. For example, the interruption of data being communicated between two devices may be utilized as an indication of disconnection and may initiate a new handshaking routine. When a new handshaking routine is initiated, for example, the voltage (and/or current) of the power supply signal provided by the initiating handshaking circuit may be stepped down to a predetermined level.

Flow chart 330 may be utilized, for example, as part of a handshaking protocol between two devices. For example, flow chart 330 may be utilized as part of an on-cable to on-device handshaking protocol over a power supply signal. Flow chart 330 may include step 331, in which a characteristic if a power supply signal is analyzed. Accordingly, for example, step 331 may analyze the voltage of a power supply signal to determine if the voltage is above (or below) a particular threshold (e.g., 2.7 volts). Once the voltage of the power supply signal is determined to be within a particular range, the power supply signal may be provided to timing circuitry in step 332. Next, the circuitry may determine whether a characteristic of the power supply signal is below (or above) a particular threshold. Accordingly, for example, step 333 may determine whether the voltage of the power supply signal is below a particular threshold (e.g., 3.1 volts). Persons skilled in the arts will appreciate that by first determining whether a voltage is above a threshold and then determining whether a voltage is below a different threshold (or vise versa) that a determination may be made as to whether a voltage is within a particular range. Such a voltage range may be of any size. Preferably, the voltage range does not include a voltage intended to be a primary power supply signal (e.g., 5 volts) and preferably the range is widened to take into account an expected margin of error for the particular environment. Once the characteristic (e.g., voltage) is determined to be within a particular range, a counting circuit may be started in step 334.

Such a counting circuit may count up based on the speed of a clock signal that drives the counting circuit. This counting circuit may, for example, be coupled to locking circuitry that may lock the counter at a particular value once it is reached. A single output bit, or any number of output bits, from the counter may be utilized as a control signal. For example, once a counter reaches 128, the seventh bit (i.e., the most significant bit) may change from a logic "0" to a logic "1." The locking circuitry may be utilized to hold the value of the counter once this bit changes to a logic "1" and may be utilized to determine when a characteristic (e.g., the voltage) of the power supply signal has remained within a particular voltage range for a particular period of time. Persons skilled in the art will appreciate that the dynamics of the counting circuit and/or clock may be changed so that a particular count (e.g., 128) reflects a particular amount of time (e.g., ½ second).

Step 335 may be initiated once the counting circuit reaches a particular count. In step 335, a characteristic (e.g., the current) of the power supply signal may be changed such that the device sending the power supply signal can recognize that an appropriate device has received the power supply signal for at least a particular period of time. Such a device may then change a characteristic of the power supply voltage. For example, such a device may increase the power supply voltage from a safe, protected voltage level utilized for identification to a voltage level utilized for powering a device. Persons skilled in the art will appreciate that a safe, protected voltage level may be a voltage level that is unlikely to cause bodily harm or pain. Such a safe, protected voltage level may also be unlikely to cause damage to a circuit not intended to receive the increased voltage level.

Flow chart 340 may be utilized to discern between different types of devices that may be utilized through a common plug and jack interface. Step 341 may occur, for example, when two handshaking circuits communicate with each other via a power supply signal. Once step 341 completes, the devices that the handshaking circuits are trying to protect may be able transfer both power and data. For example, a laptop may transfer music data to a portable music player in step 342 while simultaneously supplying a power supply signal to the portable music player in order to recharge the battery of the portable music player. The handshaking circuits may then be disconnected by removing the cable connecting two handshaking circuits.

A different device, one without a handshaking circuit, may then be placed in the plug and may still be utilized by the portable music player in step 343. For example, headphones or speakers may be connected to the plug in step 343. Here, the portable device may provide, for example, analog music signals to the plug and may turn the handshaking circuit OFF or not utilize a handshaking circuit in order to deliver such a signal. Persons skilled in the art will appreciate that headphones and/or speakers may provide information to a device to which the headphones and/or speakers are connected. For example, a volume control signal may be provided back through a plug supplying music signals, such as analog or digital music signals, to the headphones and/or speakers.

Yet another type of device may be connected to the plug in 344. For example, a microphone may be placed in the plug through 344. Such a device may or may not include a handshaking circuit. For example, a microphone may provide signals to a power supply signal contact that is not within a range of any handshaking circuit or a primary power supply signal. Accordingly, a handshaking circuit within a device receiving a microphone signal may recognize such a voltage and, in doing so, may recognize that a microphone is connected to a plug. As such, the handshaking circuit may allow the device to utilize the plug as a microphone plug and, for example, receive an analog microphone signal in step 345. As shown above, a device with a handshaking circuit and a single plug may utilize the same plug for a number of different types of devices that require different types of interaction with the plug.

Figure 4:
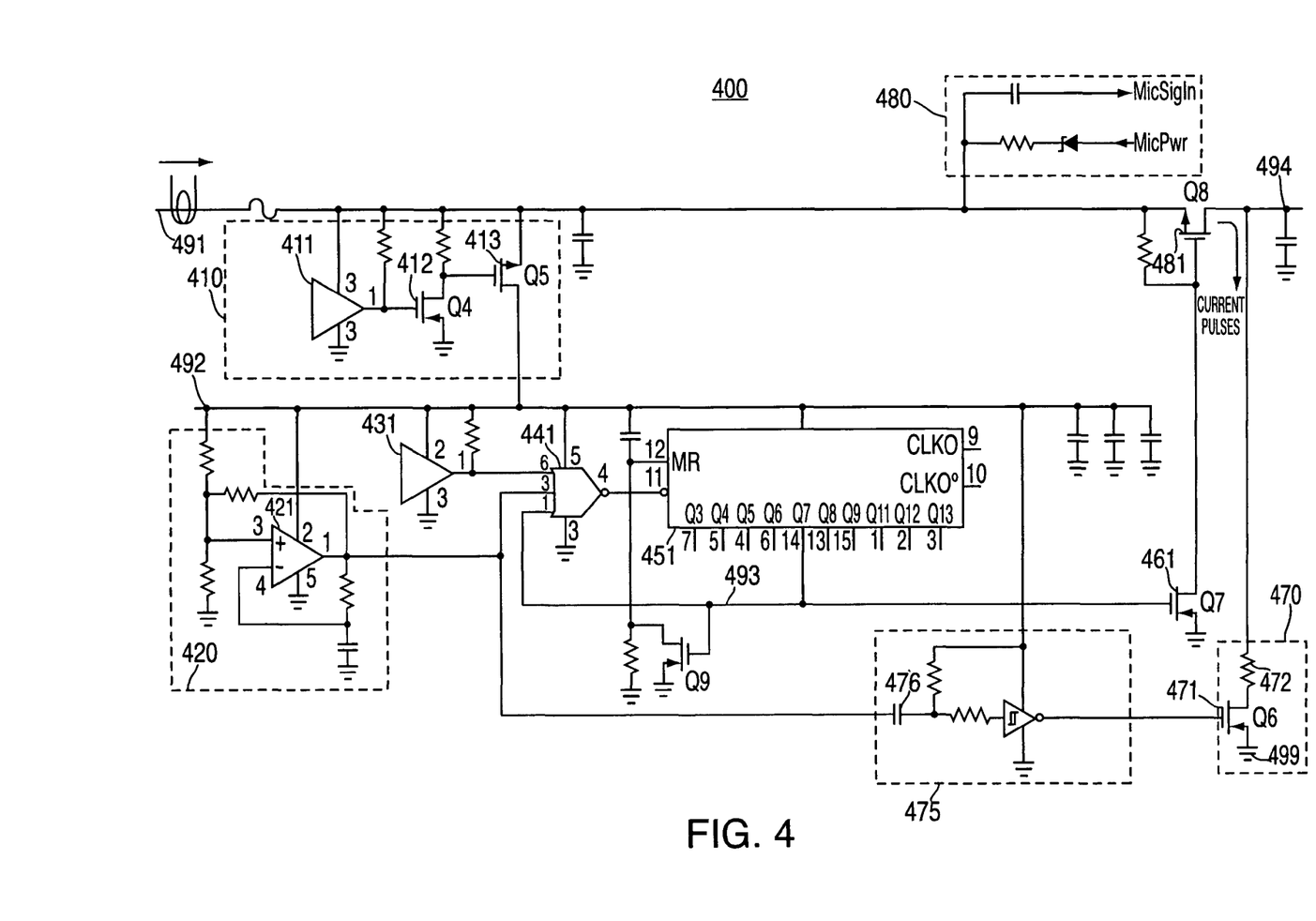
FIGS. 4 and 5 are schematics of handshaking circuits constructed in accordance with an embodiment of the present invention.

FIG. 4 shows handshaking circuit 400 that may, for example, communicate with another handshaking circuit through a power signal and, in doing so, provide the supplier of the power signal with instructions on how to provide the power signal in the future. For example, handshaking circuit 400 may protect a device from receiving relatively HIGH voltages before the device is ready to receive such HIGH voltages. Handshaking circuit 400 may, for example, be included in a device receiving a power signal and the device supplying the power signal may include another handshaking circuit.

Persons skilled in the art will appreciate that a device and/or cable may include two handshaking circuits where one handshaking circuit is utilized when supplying power and the other handshaking device is utilized when receiving power. Alternatively, for example, a handshaking circuit may be provided that includes the ability to perform both the initiating steps of a handshake (e.g., by varying a supply voltage to a predetermined level) and the responding handshake (e.g., by supplying the appropriate current pulses). In doing so, for example, a device (e.g., a portable media device) may be able to communicate both with a power supplying device providing power (e.g., a laptop) to a rechargeable battery located on the device and an accessory (e.g., a microphone/speaker accessory) in need of power. Accordingly, for example, the inclusion of both functionalities allows a device to communicate with power supply devices and devices needing power through a common jack such as a microphone jack or a 30-pin connector.

Handshaking circuit 400 may determine whether a power supply signal is within a particular voltage range for a period of time. If so, handshaking circuit 400 may manipulate the current of the power supply signal, by introducing identifiable current pulses into the power supply signal, to instruct the provider of the power supply signal to perform an operation. For example, the provider of the power supply signal may recognize the current pulses and step-up the voltage of the power supply signal from a relatively LOW voltage (e.g., 2.9 volts) to a relatively HIGH voltage (e.g., 5 volts).

Handshaking circuit 400 may include input node 491 that is electrically coupled to a power contact of an input/output jack. When the input/output plug of a device properly mates with such an input/output jack, a power supply signal may be received on node 491 from the device.

Voltage detection circuitry 410 may be included in handshaking circuit 400. Voltage detection circuitry 410 may utilize voltage detector 411 to determine whether the voltage of the power supply signal on node 491 meets a particular threshold. For example, voltage detector 411 may determine whether the voltage of the power supply signal on node 491 is above a particular threshold (e.g., 2.7 volts). If the threshold is met, voltage detector 411 may provide a signal to turn switch 413 ON. Persons skilled in the art will appreciate that some voltage detectors (e.g., comparators) may provide a signal that does not have the correct polarity to turn ON some switching circuits (e.g., transistors). In such instances, for example, inverting circuit 412 may be provided to invert the polarity of the signal that is provided by voltage detector 411 to turn switch 413 ON.

Once switch 413 turns ON, switch 413 may allow the power supply signal on node 491 to flow to node 492. Oscillator circuit 420 may be included in handshaking circuit 400. Oscillator circuit 420 may be, for example, a low-powered oscillator circuit that runs at a steady frequency over time (e.g., 200 Hz). Oscillator circuit 420 may be configured, for example, to run only when a power supply voltage is provided to node 492 via switch 413. Particularly, node 492 may provide a power signal to oscillator 421. The output of oscillator 421 of oscillator circuit 420 may be provided to a logic gate, such as NOR gate 441.

In this manner, a power supply voltage can be stepped down to provide a handshaking functionality, yet still provide sufficient power to power the circuitry of a handshaking device. Accordingly, a device having a handshaking circuit may have a battery that is completely drained of power, yet a handshaking circuit of a device may be powered even if a power supply voltage is stepped down for handshaking purposes.

The power supply signal provided to node 492 via switch 413 may also be provided to voltage detector 431. Voltage detector 431 may determine whether the voltage of the power supply signal provided to node 492 meets a particular threshold. For example, voltage detector 431 may determine whether the voltage of the power supply signal falls below a particular threshold (e.g., 3.1 volts). Persons skilled in the art will appreciate that voltage detectors 411 and 431 may, when utilized together, determine whether a voltage of the power supply signal falls within a pre-determined range of voltages (e.g., 2.7 volts to 3.1 volts). Such a range may take into account a margin of error for a particular environment. For example, if handshaking circuit 400 expects to receive a power supply signal having a voltage of 2.9 volts, yet a margin of error is determined to be 0.2 volts, the handshaking circuit can widen the expected voltage (2.9 volts) to include the margin of error (e.g., 2.7 volts to 3.1 volts).

The output of voltage detector 431 may be provided, for example, to the same logic gate that received the output of oscillator circuit 420. For example, the outputs of voltage detector 431 and 420 may be provided to NOR gate 441.

NOR gate 441 may have any number of inputs (e.g., three). As gate 441 has a NOR functionality, the output of NOR gate 441 may turn LOW whenever any of the inputs to the NOR gate is HIGH. Persons skilled in the art will appreciate that voltage detector 431 may be configured, or may be coupled to circuitry, such that if the threshold of voltage detector 431 is met, a LOW signal may be provided to NOR gate 441. Accordingly, NOR gate 441 may clock counter 451 at the frequency of oscillator 421 so long as the threshold of voltage detector 431 is met.

Persons skilled in the art will also appreciate that node 493 may be configured to initially provide a LOW signal to NOR gate 441 such that counter 451 may be enabled. Particularly, node 493 may be electrically coupled to an output bit of counter 451 (e.g., the seventh most significant output bit of counter 451). Accordingly, counter 451 may initiate with an initial count of 0. As such, every output bit of counter 451 may include a LOW signal (e.g., 0 volts or a logic "0" voltage signal).

So long as voltage detector 441 provides a LOW signal (e.g., the threshold of voltage detector 441 is met), NOR gate will cause counter 451 to count up from a starting value (e.g., 0) at the rate of oscillator 421. As counter 451 counts up, the output bits of counter 451 may start to change states. For example, when counter 451 counts from 0 to 1, the least significant output bit may change from a LOW signal to a HIGH signal. Accordingly, counter 451 may be utilized to count to any value and, as a result, counter 451 may be utilized to count any amount of time. For example, counter 451 may be configured such that the counter reaches 128 (e.g., the seventh most significant bit is changed from a LOW signal to a HIGH signal) after a pre-determined amount of time (e.g., 0.6 seconds). Such an output bit may be utilized as the input to NOR gate 441 such that the output of NOR gate 441 switches from HIGH to LOW when counter 451 reaches a count of 128. In doing so, counter 451 is instructed to stop counting, as pulses from oscillator 421 are no longer passed onto counter 451, and counter 451 will hold (e.g., latch onto) the last counted value (e.g., 128). In turn, the output bit utilized to switch NOR gate 441 OFF may also remain constant. Accordingly, this output bit may be utilized to provide control signals to additional components of handshaking circuit 400 via node 493.

Node 493 may be utilized, for example, to turn switch 461 ON once counter 451 measures a predetermined amount of time. Switch 461 may, in turn, cause switch 481 to turn ON. For example, switch 461 may electrically couple a gate terminal of switch 481 to ground in order to turn switch 481 ON.

Persons skilled in the art will appreciate that the primary circuitry of a device (e.g., a portable music player) may be coupled to node 494. Such primary circuitry may include a voltage detector to determine whether the voltage being supplied to the primary circuitry is primary power supply signal (e.g., 5 volts) by including a voltage detector to detect whether the received power supply signal is adequate (e.g., above 4.5 volts).

In turning switch 481 ON, the power supply signal on node 491 is provided to pulse generator circuit 470. Pulse generator circuit 470 operates as follows. When switch 471 is turned ON, the power supply voltage at node 494 dissipates over resistor 472 into ground 499 via switch 471. In doing so, resistor 472 creates current pulses in the power supply signal at the switching rate of oscillator 421.

Person skilled in the art will appreciate that a handshaking circuit may utilize both power leads (e.g., a power contact and a ground contact) in order to provide a handshaking functionality. For example, ground 499 may be coupled to the ground contact of an input/output jack on a device. In doing so, a handshaking circuit may receive information via a ground contact. For example, the handshaking circuit may receive a virtual ground at ground 499 from another handshaking circuit that has a non-zero value (e.g., 1 volt). The handshaking circuit may utilize this virtual ground to embed information for the other handshaking circuit (e.g., impart current pulses into the virtual ground). Moreover, a handshaking circuit may utilize both a power and a ground contact to both send information to, and receive information from, any number of handshaking circuits.

Driving circuit 475 may be provided to drive the switching characteristics of switch 471 of pulse generator 470. Driving circuit 475 may include capacitor 476 which generates a pulse that switches ON switch 471 by electrically coupling the gate terminal of switch 471 to ground. Person skilled in the art will appreciate that the capacitance of capacitor 476 may determine, at least in part, the amount of time that switch 471 is turned ON. For example, capacitor 476 may be configured to turn switch 471 ON for a particular amount of time at a particular period of time. For example, capacitor 476 may turn switch 471 ON approximately 4 microseconds every 5 milliseconds (e.g., witch may be set by oscillator 420). Such a switching characteristic of switch 471 may, in turn, generate a current pulse (based on the resistance of resistor 472) that has a duty cycle of 4 microseconds divided by 5 milliseconds (or 0.1% duty cycle). In this manner, capacitor 476 may provide a LOW duty cycle current pulse in a power supply signal. Such a LOW duty cycle current pulse may have a duty cycle of, for example, less than 1. A LOW duty cycle current pulse may, for example, have a duty cycle of less than 0.1%. Persons skilled in the art will also appreciate that if resistor 472 has a resistance of approximately 47 ohms and 2.9 volts is provided across resistor 472, then 60 milliamps of current may flow through resistor 472 for a voltage on node 491 of 2.9 volts. Accordingly, pulse generator circuit 470 may produce relatively HIGH current, LOW duty cycle current pulses. Furthering this example, as current remains constant across a node, the handshaking circuit providing power to node 491 will also include 60 milliamps of current. Handshaking circuit may be configured to send different types of current pulses (e.g., a 40 milliamp pulse and a 60 milliamp pulse) in order to provide different types of instructions to the handshaking circuit providing the power supply signal. Similarly, the handshaking circuit providing the power supply signal may operate in different ways (e.g., step-up or step-down the voltage of a power supply signal) based on different instructions the handshaking circuit receives back through the supplied power supply signal.

Persons skilled in the art will appreciate that switch 481 may, for example, not be turned ON until a handshaking process is complete. Accordingly, for example, a proper handshake may need to occur before the primary circuitry of a device (e.g., a portable music player) is able to utilize a power supply signal from node 491. Such a handshake may, for example, cause node 491 to electrically couple to node 494. Current pulses may, for example, be continually applied after a handshaking process completes, such that when two devices are disconnected, the initiating handshaking circuit can detect a loss of receipt of the correct current pulses and can step-down the voltage of the supply voltage to a safe and protected level (e.g., 2.9 volts).

Persons skilled in the art will appreciate that switch 481 may isolate node 491 from node 494 such that, for example, microphone circuitry 480 may be coupled to node 491. Persons skilled in the art will appreciate that the frequency of current pulses of a responding handshaking circuit may also be changed to, for example, provide different types of information to an initiating handshaking circuit. Modulation techniques may also be utilized when generating current pulses in order to enhance the security of a connection. In this manner, the current pulses may be encrypted via modulation techniques such that an initiating handshaking circuit that receives the current pulses may know the modulation scheme applied to the current pulses and may demodulate the current pulses in order to decrypt the information stored in the current pulses. In this manner, handshaking circuits may be provided that communicate using encrypted information that is transmitted over a power supply line.

Figure 5:
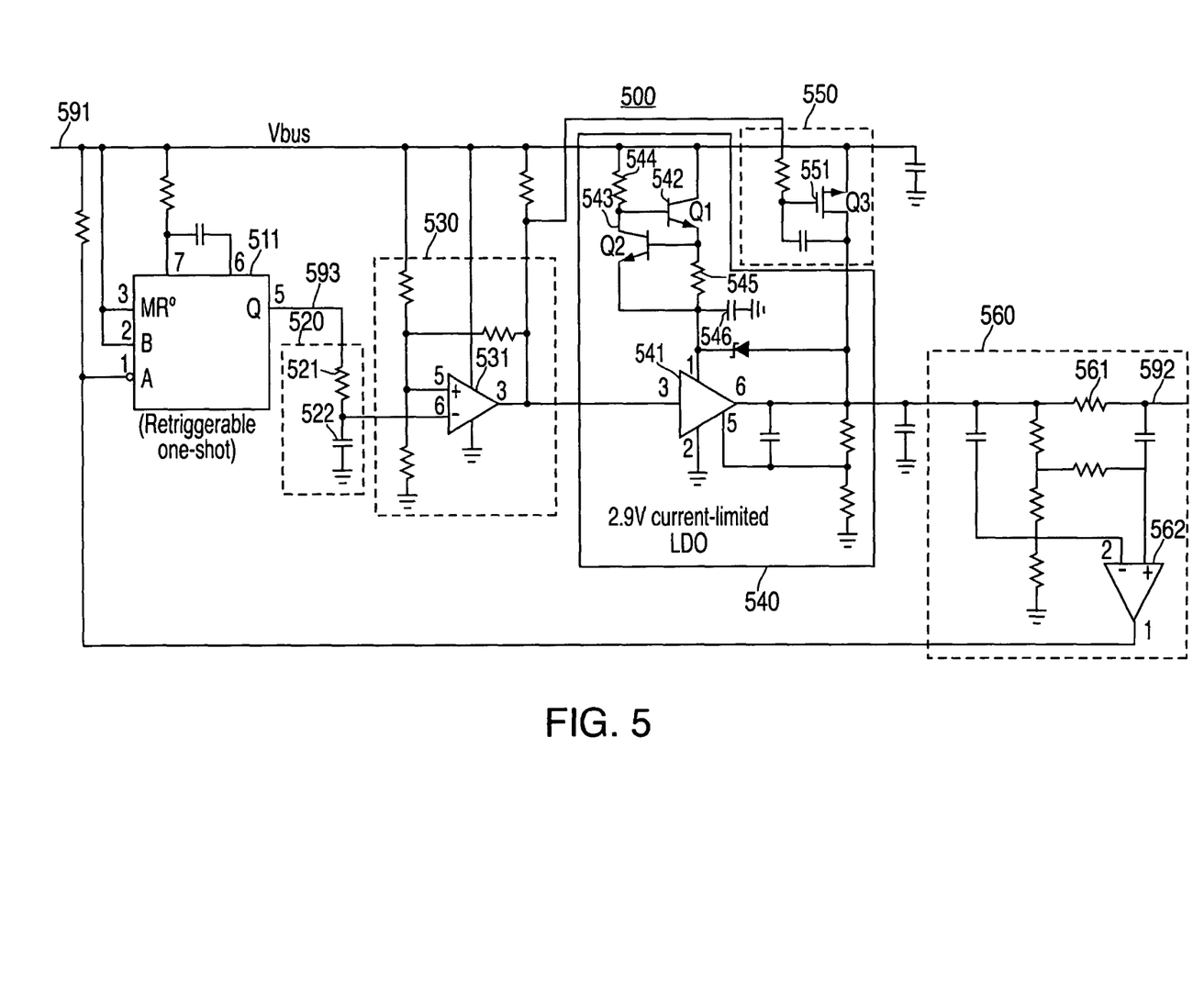

FIG. 5 shows handshaking circuit 500 that may, for example, provide a power supply signal to a device and determine whether such a device includes a handshaking circuit operable to communicate with handshaking circuit 500. More particularly, handshaking circuit 500 may provide a power supply signal at a particular voltage (e.g., LOW or HIGH) at node 592. Handshaking circuit 500 may also receive, for example, current pulses at node 592 while handshaking circuit 500 is delivering a power supply signal.

Current pulses created by a handshaking circuit (e.g., handshaking circuit 400 of FIG. 4) may be provided to node 592 while handshaking circuit 500 is providing a power supply signal at node 592. Current pulse detector 560 may be utilized, for example, to detect incoming current pulses. Persons skilled in the art will appreciate that a current pulse detector may also recognize different types of current pulses and may react differently depending on the type of current pulses that are received. Generally, sense resistor 561 may be utilized to sense changes in current and may provide different voltage signals to comparator 562 to determine whether the appropriate current pulses have been received. Handshaking circuit 500 may include any number of comparators to sense any number of different types of current pulses. Similarly, handshaking circuit 500 may include any number of sense resistors to sense any number of different types of current pulses. Current mirrors may be utilized to provide these resistors with a current identical to the one on a particular node (e.g., a power supply node).

When an appropriate current pulse is detected, the output of comparator 562 may provide a logic HIGH signal. In doing so, pulse stretching circuit 511 may trigger the generation of a pulse. Pulse stretching circuit 511 may, for example, generate pulses that have a duration longer than those created by the output of comparator 562. In fact, pulse stretching circuit 511 may, for example, generate pulses that have a duration that is multiple times longer (e.g., twice as long) as the period of pulses from node 592. Pulse stretching circuit 511 may also be re-triggerable in that the circuit may restart generating a pulse when enabled. In this manner, pulse stretching circuit 511 may not have to wait until a pulse is finished generating in order to generate a new pulse. As such, pulse stretching circuit 511 may, for example, provide a constant signal to node 593—without interruption—so long as current pulses are sensed by pulse detector 560.

Delay circuit 520 may be provided to delay the signal generated from pulse stretching circuit 511. For example, the characteristics of resistor 521 and capacitor 522 may be chosen to implement a particular time delay (e.g., 0.5 seconds). For example, the voltage across capacitor 522 may build-up over time and may, at a predetermined time, enable switching circuit 530 by causing the output of comparator 531 to go LOW. In turn, the output of comparator 531 may disable voltage regulation circuit 540 and enable switch 551 such that the voltage of the power supply signal provided to node 592 is stepped up from a safe, protected voltage (e.g., 2.9 volts) to a primary power supply voltage (e.g., 5.0 volts). More particularly, when power regulation circuit 540 is disabled, switch circuit 550 is turned ON and primary power on node 591 is electrically coupled with node 592.

Before current pulses are received at node 592 and detected by pulse detection circuit 560, voltage regulation circuit 540 may be enabled such that the primary power supply signal on node 591 may be stepped-down by voltage regulation circuit 540 to a particular voltage (e.g., 2.9 volts). While device 541 is enabled, switch circuit 550 is OFF such that the power supply signal on node 591 does not directly couple with node 592. Accordingly, device 541 steps-down the voltage of the power supply signal on node 591 and provides this stepped down voltage on node 592 as a result of, for example, the characteristics of switch 542, switch 543, resistor 544, resistor 545, and capacitor 546.

Persons skilled in the art will appreciate that a jack on a device may either be a male connector, female connector, or may take a shape that is neither male nor female. Similarly, a plug on a cable may either be a male connector, female connector, or may take a shape that is neither male nor female.

Persons skilled in the art will appreciate that current pulses may be generated such that the average current for these current pulses is LOW (e.g., 50 microamps) although the individual current pulses have a relatively HIGH current (e.g., 60 milliamps).

From the foregoing description, persons skilled in the art will recognize that this invention provides handshaking between devices. In addition, persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and apparatuses, but is intended to include variations to and modifications thereof which are within the spirit of the following claims.

What is claimed is:

1. A method for restricting supply of power between a first device and a second device, the method comprising:
    receiving power at the first device, the first device comprising handshaking circuitry operative to selectively provide a power supply signal including a first characteristic or a second characteristic to the second device depending on whether a series of predetermined current pulses are detected on the power supply signal;
    monitoring, at the handshaking circuitry, the power supply signal to determine whether the series of predetermined current pulses are being received;
    providing the power supply signal having the first characteristic to the second device when the series of predetermined current pulses are not being received on the power supply signal; and
    providing the power supply signal having the second characteristic to the second device while the series of predetermined current pulses are being received on the power supply signal.

2. The method of claim 1, wherein the first characteristic of the power supply signal comprises a current limited, stepped-down voltage power supply signal.

3. The method of claim 1, wherein the second characteristic of the power supply signal comprises a stepped-up voltage power supply signal, wherein the stepped-up voltage power supply signal has a higher voltage level than the first characteristic of the power supply signal.

4. The method of claim 1, wherein the power supply signal having the second characteristic is substantially the same as the received power.

5. The method of claim 1, wherein the first device is a cable that is coupled to the second device, and wherein the first handshaking circuitry is located within the cable.

6. The method of claim 5, wherein the cable comprises one or more plugs.

7. The method of claim 6, wherein at least one of the plugs is a Universal Serial Bus plug.

8. The method of claim 6, wherein at least one of the plugs is a 30-pin connector plug or a multi-region plug.

9. The method of claim 1, wherein the first device is a power supply, and wherein the first handshaking circuitry is located within the power supply.

10. The method of claim 1, wherein providing the power supply signal having the second characteristic to the second device comprises:
    disabling power regulation circuitry operative to provide the power supply signal having the first characteristic; and
    enabling a switch that couples the received power to the second device.

11. A method for using a power supply signal between a first device and a second device, the method comprising:
    receiving the power supply signal with a first handshaking circuitry of the first device;
    changing a first characteristic of the power supply signal, wherein the first characteristic is changed by the first handshaking circuitry;
    recognizing the changed first characteristic with a second handshaking circuitry of the second device;
    introducing current spikes into the power supply signal in response to recognizing the changed first characteristic, wherein the current spikes are introduced by the second handshaking circuitry;
    recognizing the current spikes with the first handshaking circuitry; and
    altering a second characteristic of the power supply signal in response to recognizing the current spikes, wherein the second characteristic is altered by the first handshaking circuitry;
    wherein the first device is a cable that is coupled to the second device, and wherein the first handshaking circuitry is located within the cable;
    wherein the cable comprises one or more plugs; and
    wherein at least one of the plugs is a Universal Serial Bus plug.

12. The method of claim 11, wherein at least one of the plugs is a 30-pin connector plug or a multi-region plug.

13. An electronic device comprising:
    electrical contacts for interfacing with another device;
    handshaking circuitry electrically coupled to at least one of the electrical contacts, the handshaking circuitry operative to:
        selectively provide a power supply signal including a first characteristic or a second characteristic to the other device via the at least one of the electrical contacts depending on whether a series of predetermined current pulses are monitored on the power supply signal;
        monitor the at least one electrical contact to determine whether a series of predetermined current pulses are being received on the power supply signal;
        wherein the power supply signal having the first characteristic is provided to the other device when the series of predetermined current pulses are not monitored as being received on the power supply signal; and
        wherein the power supply signal having the second characteristic is provided to the other device while the series of predetermined current pulses are monitored as being received on the power supply signal.

14. The electronic device of claim 13, wherein the at least one electrical contact is included as part of a multi-region plug.

15. The electronic device of claim 14, wherein the multi-region plug is a four region jack having a diameter of about 3.5 mm.

16. The electronic device of claim 13, wherein the at least one electrical contact comprises a first set of electrical contacts, the cable system further comprising a male USB plug that is electrically coupled to the handshaking circuitry.

17. The electronic device of claim 13, wherein the first characteristic of the power supply signal comprises a current limited, stepped-down voltage power supply signal.

18. The electronic device of claim 17, wherein the second characteristic of the power supply signal comprises a stepped-up voltage power supply signal that has a higher voltage level than the current limited, stepped-down voltage power supply signal.

19. The electronic device of claim 13, wherein the handshaking circuitry comprises:

a current pulse detector coupled to the at least one electrical contact, the current pulse detector operative to output a pulse in response to detecting each of the predetermined series of current pulses on the power supply signal;

a pulse stretching circuit having an input coupled to the current pulse detector, the pulse stretching circuit operative to output an extended pulse in response to each pulse output by the current pulse detector; and switching circuit operative to selectively disable voltage regulation circuitry that provides the power supply signal having the first characteristic and enable a switch that provides the power supply signal having the second characteristic while receiving the extended pulse.

20. The electronic device of claim 19, wherein the switching circuit is operative to selectively enable the voltage regulation circuitry and disable the switch while not receiving the extended pulse.

* * * * *